(12) United States Patent
Schramm

(10) Patent No.: US 11,536,491 B2
(45) Date of Patent: Dec. 27, 2022

(54) ELECTRIC INTEGRATED CIRCUIT WATER HEATER SYSTEM

(71) Applicant: Kurt Schramm, Denver, CO (US)

(72) Inventor: Kurt Schramm, Denver, CO (US)

( * ) Notice: Subject to any disclaimer, the term of this patent is extended or adjusted under 35 U.S.C. 154(b) by 0 days.

(21) Appl. No.: 17/217,727

(22) Filed: Mar. 30, 2021

(65) Prior Publication Data
US 2021/0302067 A1 Sep. 30, 2021

Related U.S. Application Data

(60) Provisional application No. 63/001,638, filed on Mar. 30, 2020.

(51) Int. Cl.
| | |
|---|---|
| *F24H 9/20* | (2022.01) |
| *H05B 3/82* | (2006.01) |
| *G05D 23/19* | (2006.01) |
| *F24H 9/1818* | (2022.01) |

(52) U.S. Cl.
CPC ......... *F24H 9/2028* (2013.01); *F24H 9/1818* (2013.01); *G05D 23/1906* (2013.01); *H05B 3/82* (2013.01)

(58) Field of Classification Search
None
See application file for complete search history.

(56) References Cited

U.S. PATENT DOCUMENTS

| | | | | |
|---|---|---|---|---|
| 411,737 A | * | 9/1889 | Smith | F22B 1/284 392/401 |
| 1,069,679 A | * | 8/1913 | Wallace | F24H 1/102 392/493 |
| 1,360,510 A | * | 11/1920 | Elliott | H05B 3/06 219/544 |
| 1,511,553 A | * | 10/1924 | Willson | F24D 13/04 392/487 |
| 1,731,058 A | * | 10/1929 | Pierson | F24H 1/102 392/501 |
| 1,850,156 A | * | 3/1932 | Richardson | F24H 1/102 392/492 |
| 1,999,473 A | * | 4/1935 | Osnos | G05D 23/1919 236/1 R |
| 2,297,030 A | * | 9/1942 | Snyder | G05D 23/27537 392/448 |
| 2,834,865 A | * | 5/1958 | Coates | F24H 1/202 392/450 |

(Continued)

OTHER PUBLICATIONS

PCT/US2021/024944; "International Search Report and Written Opinion"; dated Jun. 29, 2021; 7 pages.

*Primary Examiner* — Thor S Campbell
(74) *Attorney, Agent, or Firm* — Hall Estill Law Firm

(57) ABSTRACT

An electric integrated circuit water heater apparatus includes: a cold water inlet for allowing input of cold water into a storage tank with heating elements comprised of integrated circuits configured to exchange heat from the heating elements to the water in the storage tank through a heat exchanger, in which heat produced by running the integrated circuits is recovered into the heat exchanger, thereby heating the stored water by using heat from the integrated circuits. A hot water outlet is provided in the upper portion of storage tank such that the water will have passed all of the heating elements prior to exiting the hot water outlet.

10 Claims, 9 Drawing Sheets

(56) References Cited

U.S. PATENT DOCUMENTS

| | | | | |
|---|---|---|---|---|
| 3,280,299 | A * | 10/1966 | Doniak | F24H 1/102 |
| | | | | 392/490 |
| 4,598,694 | A * | 7/1986 | Cromer | F28D 20/0039 |
| | | | | 122/19.1 |
| 4,692,592 | A * | 9/1987 | Kale | F28D 20/0039 |
| | | | | 392/450 |
| 4,777,347 | A * | 10/1988 | Mottershead | F24H 1/202 |
| | | | | 122/19.1 |
| 4,797,534 | A * | 1/1989 | Prager | H05B 3/141 |
| | | | | 219/505 |
| 5,442,157 | A * | 8/1995 | Jackson | F24H 9/2035 |
| | | | | 219/483 |
| 5,784,531 | A * | 7/1998 | Mann | F24H 9/2028 |
| | | | | 219/486 |
| 6,370,328 | B1 * | 4/2002 | Mottershead | F28D 20/0039 |
| | | | | 392/452 |
| 9,989,271 | B1 * | 6/2018 | Becker | F24F 5/0021 |
| 10,912,222 | B2 * | 2/2021 | Inano | H05K 7/20281 |
| 2003/0021597 | A1 * | 1/2003 | Chu | F24H 9/2028 |
| | | | | 392/486 |
| 2004/0136164 | A1 * | 7/2004 | Morris | H05K 1/141 |
| | | | | 361/721 |
| 2009/0056644 | A1 | 3/2009 | Phillips et al. | |
| 2009/0120618 | A1 * | 5/2009 | Konig | F01K 25/10 |
| | | | | 165/104.21 |
| 2010/0319681 | A1 | 12/2010 | Li | |
| 2013/0114204 | A1 * | 5/2013 | Nigen | G06F 1/203 |
| | | | | 361/679.48 |
| 2014/0277816 | A1 | 9/2014 | Branecky | |
| 2016/0363347 | A1 | 12/2016 | Chaudhry et al. | |
| 2017/0088446 | A1 * | 3/2017 | Hughes | C02F 1/008 |
| 2018/0018000 | A1 * | 1/2018 | Cader | B33Y 80/00 |
| 2019/0029146 | A1 * | 1/2019 | Cuda | H05K 7/20763 |
| 2019/0098798 | A1 * | 3/2019 | Franz | H05K 7/20254 |
| 2020/0084914 | A1 * | 3/2020 | Kumagai | H01L 23/3107 |

\* cited by examiner

ELECTRIC INTEGRATED CIRCUIT WATER HEATER SYSTEM

CROSS-REFERENCE TO RELATED APPLICATIONS

The present application is a conversion of U.S. Provisional Application having U.S. Ser. No. 63/001,638, filed Mar. 30, 2020, which claims the benefit under 35 U.S.C. 119(e), the disclosures of which are hereby expressly incorporated herein by reference.

STATEMENT REGARDING FEDERALLY SPONSORED RESEARCH OR DEVELOPMENT

Not applicable.

FIELD OF THE DISCLOSURE

The present disclosure relates to an electric hot water heater apparatus in which the heating elements serve a dual purpose to minimize energy waste.

BACKGROUND OF THE DISCLOSURE

Conventionally, the heating elements within an electric water heater are seen as a single purpose component. The energy consumed by the heating elements is transferred to the water and serves no other purposes within the system. Conventional heating elements are made from highly conductive materials such as copper and stainless steel.

An integrated circuit is an electrical circuit that consists of electric signals that take on discrete values, which represent logical and numeric values. Thus, these circuits can provide logic and memory which enables them to perform arbitrary computational functions. These could be GPUs (graphics processing unit), CPUs (central processing unit), DIMMs (dual in-line memory module), ASICs (application specific integrated circuit), TPUs (tensor processing unit) which are capable of performing processes like rapidly manipulating and altering memory to accelerate the creation of images in a frame buffer intended for output to a display device, machine learning and artificial intelligence acceleration, image and video decoding/encoding, rendering virtual or augmented reality, or processing hash functions. When used for processing, integrated circuits generate heat and need to be cooled.

Accordingly, there is need for a water heating system that has a dual purpose and is more energy efficient.

SUMMARY OF THE DISCLOSURE

The present disclosure is directed to an electric integrated circuit water heater apparatus. The apparatus includes a storage tank having a cold water inlet and hot water outlet. The apparatus also includes at least one integrated circuit disposed within the storage tank to transfer heat to the cold water in the storage tank and raise the temperature of the cold water wherein the integrated circuits perform computational processes to generate heat.

The present disclosure is also directed to a method of heating a fluid in a storage tank with electrical integrated circuits. The electric integrated circuits are positioned in a fluid storage tank. The electrical integrated circuits generate heat by performing computational processes for a computer system. The storage tank is provided with fluid that is to be heated by the electric integrated circuits. The fluid in the storage tank can be monitored and a heated fluid can be removed from the storage tank after the heated fluid achieves a desired target temperature.

BRIEF DESCRIPTION OF THE DRAWINGS

Non-limiting examples of the present disclosure are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION OF THE DISCLOSURE

Figure 1:
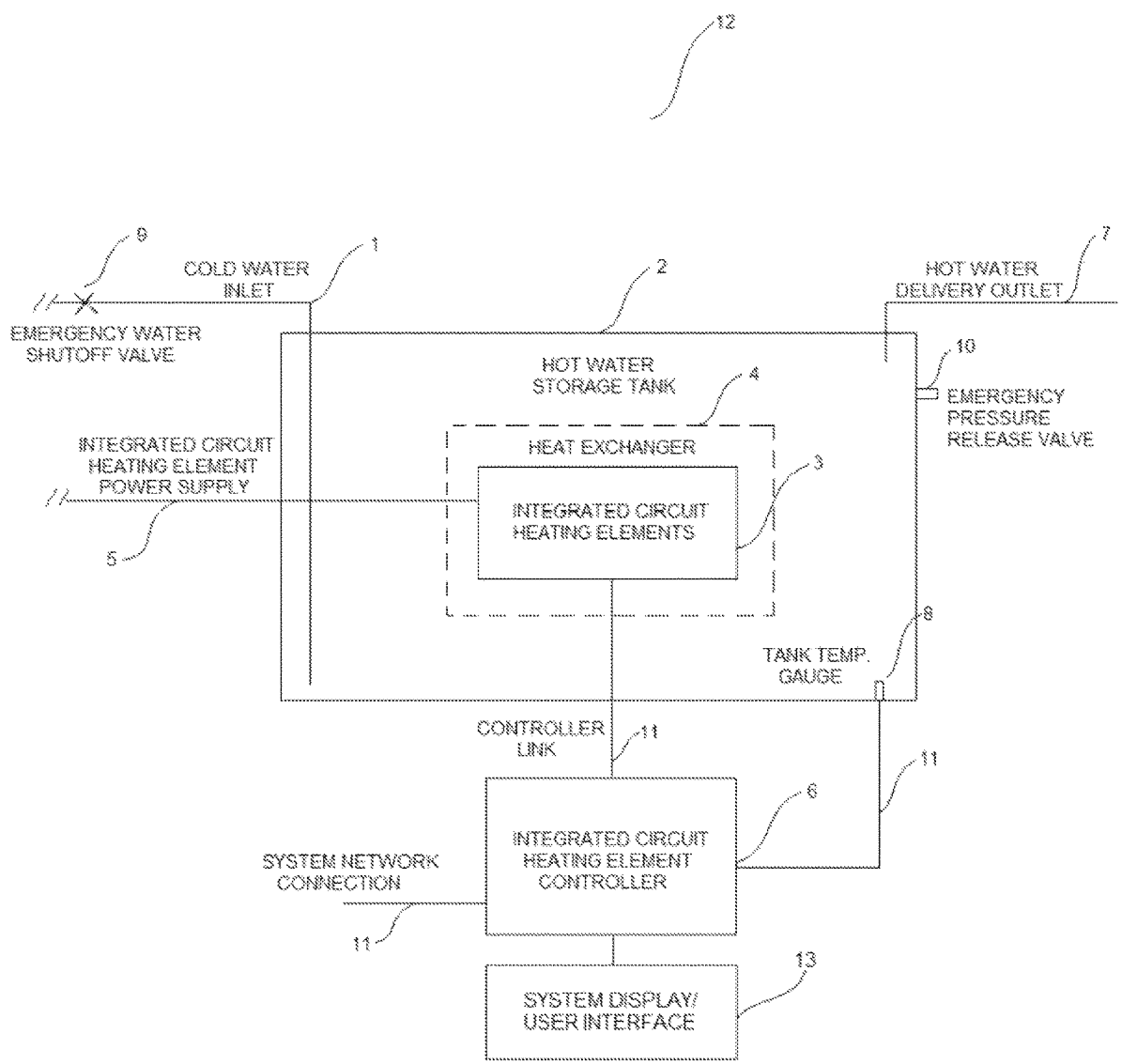
FIG. 1 is a block diagram illustrating a configuration of an electric integrated circuit water heater apparatus constructed in accordance with the present disclosure.

FIG. 1 depicts an electric integrated circuit water heater system 12. The system 12 includes a hot water storage tank 2 with a cold water inlet 1. The system 12 further includes integrated circuit heating elements 3 that are used by a computer system to perform computational processes, which can generate significant amounts of heat. The electric integrated circuit water heater system 12 are separated from the water in the storage tank 2 by a heat exchanger 4. The heat exchanger 4 can be comprised of one or more heat exchangers. The supplied power 5 is allocated to the integrated circuit heating elements 3 based off the demand determined by the integrated circuit heating element controller 6. The integrated circuit heating element controller 6 utilizes data from a storage tank temperature gauge 8 to determine how much power to supply the integrated circuit heating elements 3. When users need hot water downstream, the water from the storage tank 2 flows out a hot water delivery outlet 7.

The integrated circuit heating elements 3 can cooperate with the heat exchanger 4 in any manner known in the art wherein the integrated circuit heating elements 3 operate as intended and the heat from the integrated circuit heating elements 3 is transferred to the water in the hot water storage tank 2 via the heat exchanger 4. The heat exchanger 4 can be any type of heat exchanger known in the art. Exemplary embodiments of potential heat exchangers 4 that can function with the integrated circuit heating elements 3 are described herein. In one possible variation, the hot water storage tank 2 are fit to a solid metal plate heat exchanger 4 that encapsulates them, and separates them from water within the hot water storage tank 2. This heat exchanger 4 can be fit with a variation of heat sink fins to more efficiently distribute heat from the integrated circuit heating elements 3 depending on the orientation of the hot water storage tank 2.

In another embodiment, the integrated circuit heating elements 3 can be comprised of multiple metal containers holding a low electrical conductivity liquid coolant. The integrated circuit heating elements 3 are submerged in the low electrical conductivity coolant inside the metal container(s) within the hot water storage tank 2. This type of heat exchanger 4 design increases the rate of heat transfer from the integrated circuit heating elements 3 to the water in the hot water storage tank 2. Similar to what was described above, the heat exchangers 4 can be fit with a variation of heat sink fins depending on the orientation of the hot water storage tank 2 to maximize heat transfer from the integrated circuit heating elements 3 to the water in the hot water storage tank 2. Additionally the heat exchangers 4 can be arranged in a manner within the integrated circuit electric water heater apparatus 12 so that they can easily be removed and replaced at their end of life cycle. Users can be notified that a heat exchanger 4 needs to be replaced via the system display/user interface 13. The number of heat exchangers 4, which can contain a desired number of integrated circuit heating elements 3 can be chosen to create system redundancy where if one set of integrated circuit heating elements 3 stops functioning within one of the many heat exchangers 4 the remaining integrated circuit heating elements 3 can produce enough heat so that the system is able to maintain target temp S2 until the failed integrated circuits within the heat exchanger 4 can be removed and serviced. Due to the inherent toxicity of low conductivity dielectric fluid the integrated circuit heating elements 3 and heat exchanger 4 can be set up to be removed as a single unit.

Figure 2:
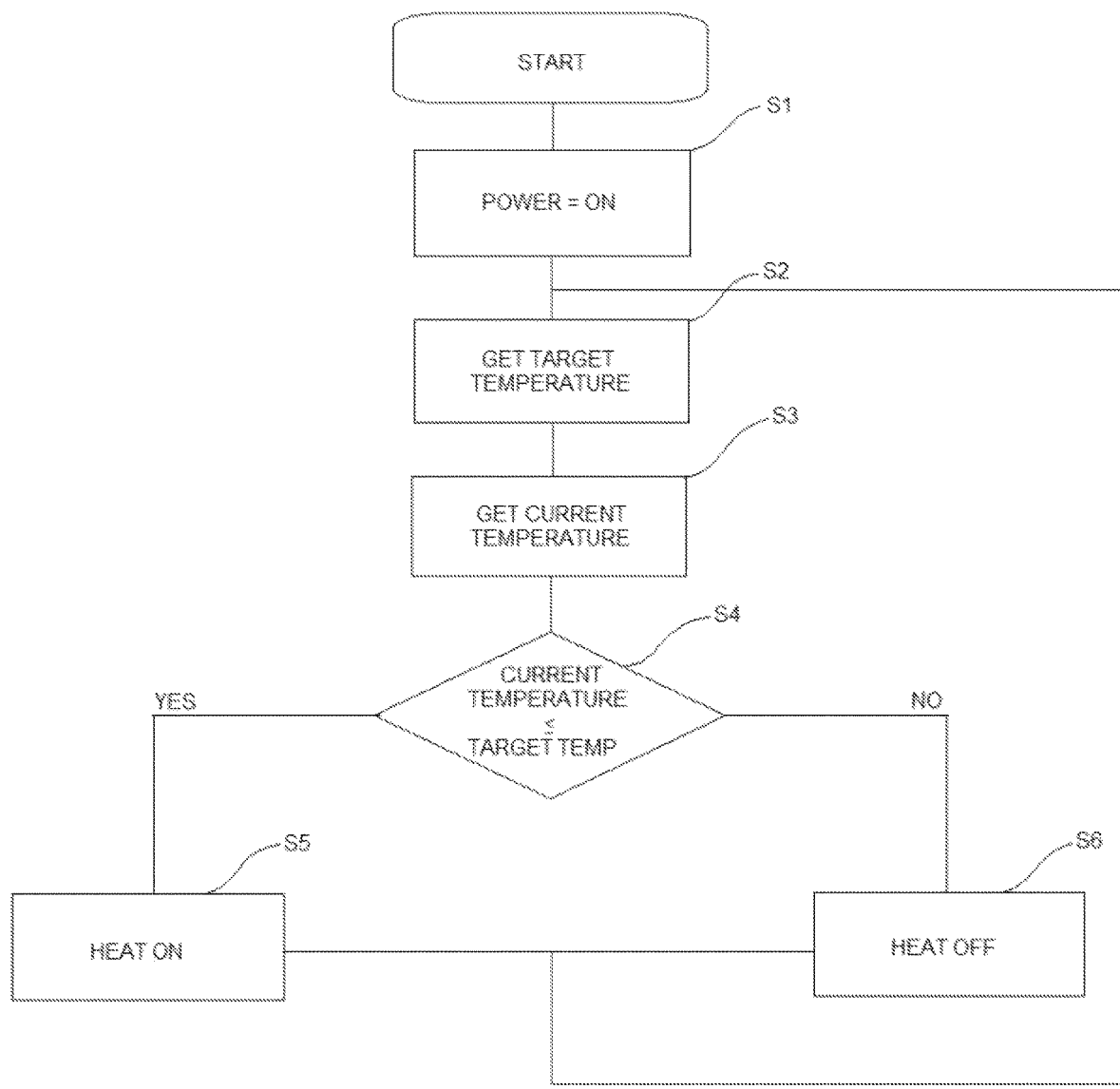
FIG. 2 is a control flowchart of the electric integrated circuit water heater apparatus.

FIG. 2 is an exemplary control flowchart of the integrated circuit electric water heater system 12 described herein. In one embodiment of the present disclosure, the operation of the integrated circuit electric water heater system 12 is described herein with reference to FIG. 2. At step S1, the controller 6 can be powered on and the controller 6 will acquire a target temp S2, which can be set by the user of the system 12. At step S3, the controller 6 uses the tank temperature gauge 8 to acquire the current temperature within the tank 2. At step S4, the controller 6 uses the current temperature in the tank 2 and the target temperature to determine if the current temp is less than or equal to the target temp. If the current temperature is less than or equal to target temperature, the controller 6 powers on the heating elements 3 at operation S5. If the current temperature is not less than or equal to the target temperature, the controller either does nothing or powers off the heating elements 3.

Figure 3:
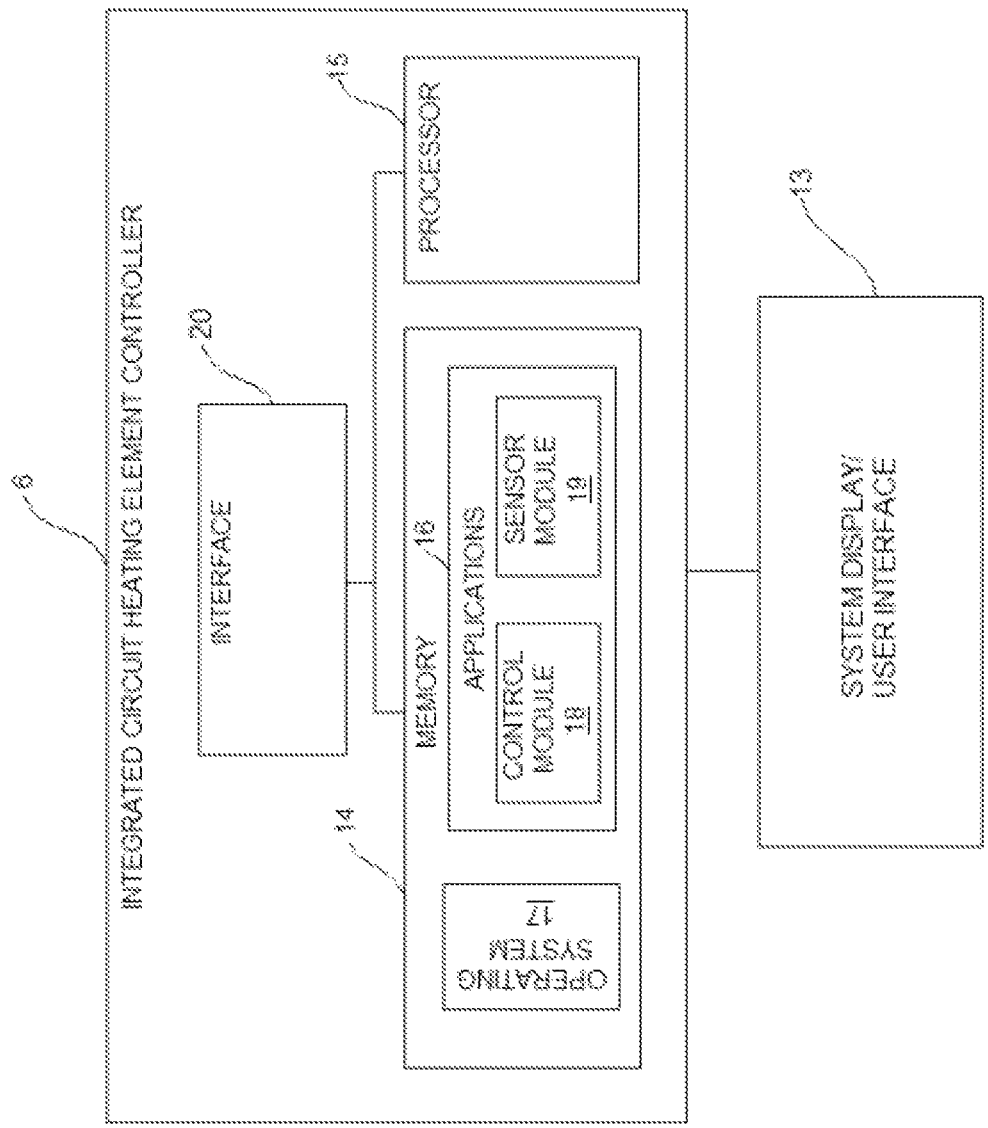
FIG. 3 is a block diagram illustrating a controller used in accordance with the present disclosure.
Figure 4A:
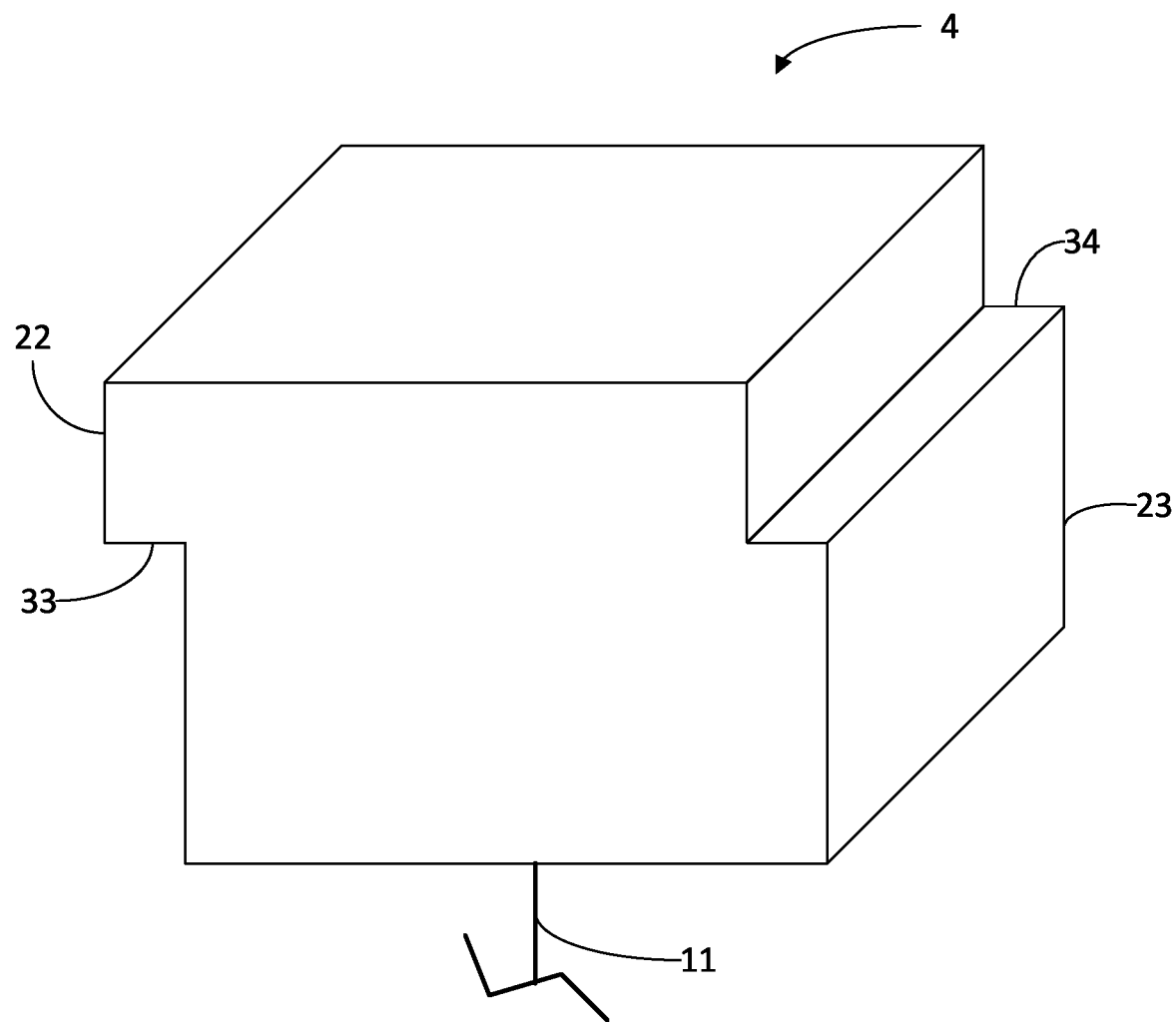
FIG. 4A is a perspective view of a heat exchanger constructed in accordance with the present disclosure.
Figure 4B:
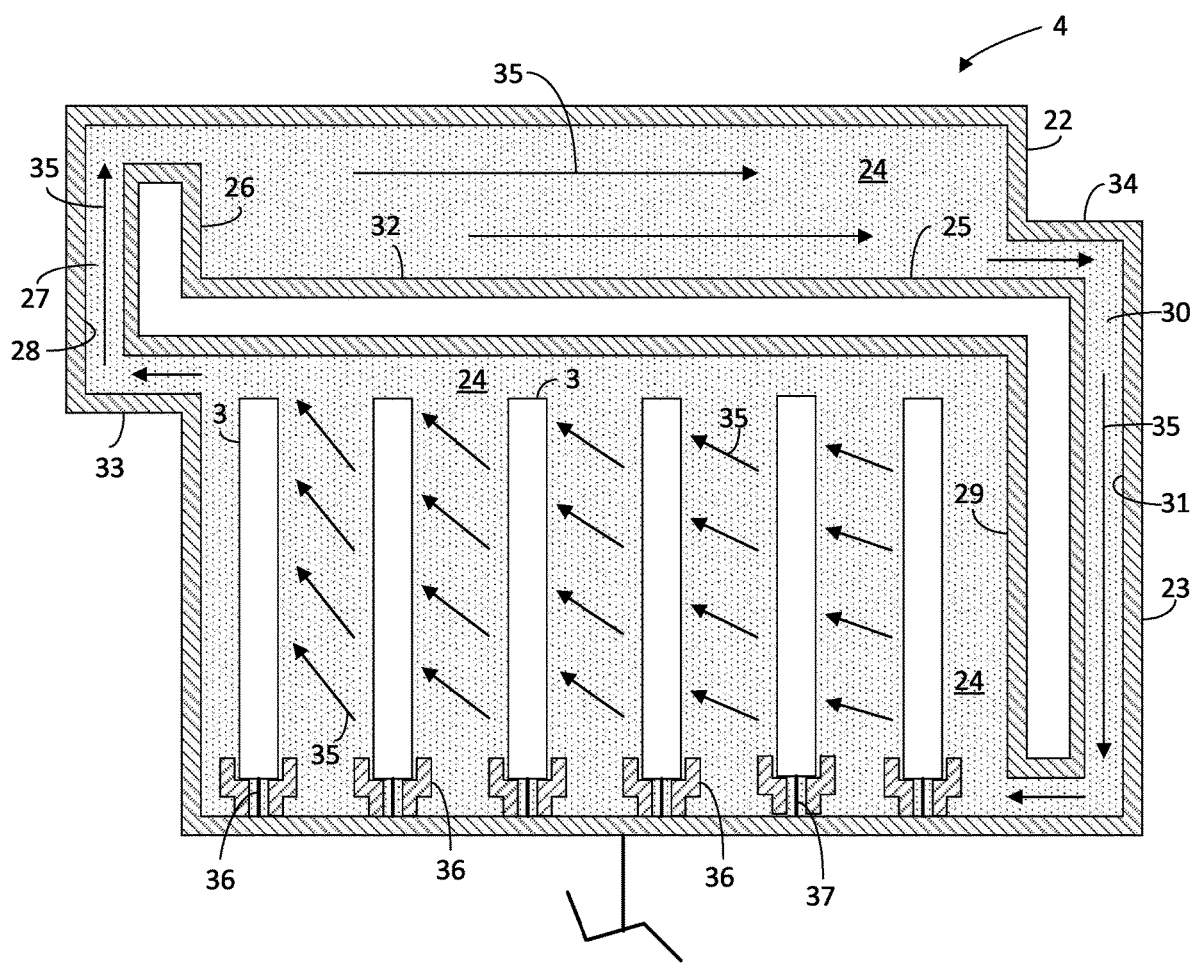
FIG. 4B is a vertical, cross-sectional view of a portion of the heat exchanger shown in FIG. 4A and constructed in accordance with the present disclosure.
Figure 4C:
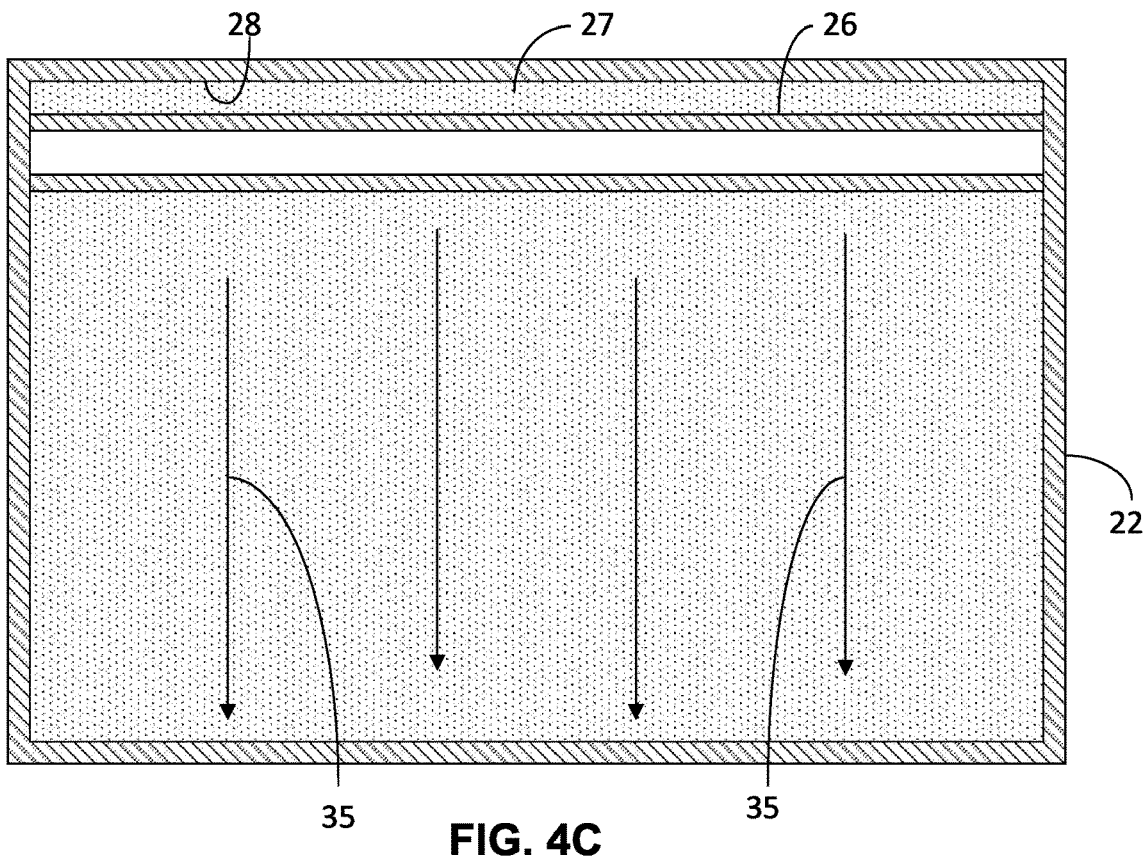
FIG. 4C is a horizontal, cross-sectional view of an upper portion of the heat exchanger shown in FIG. 4A and constructed in accordance with the present disclosure.
Figure 4D:
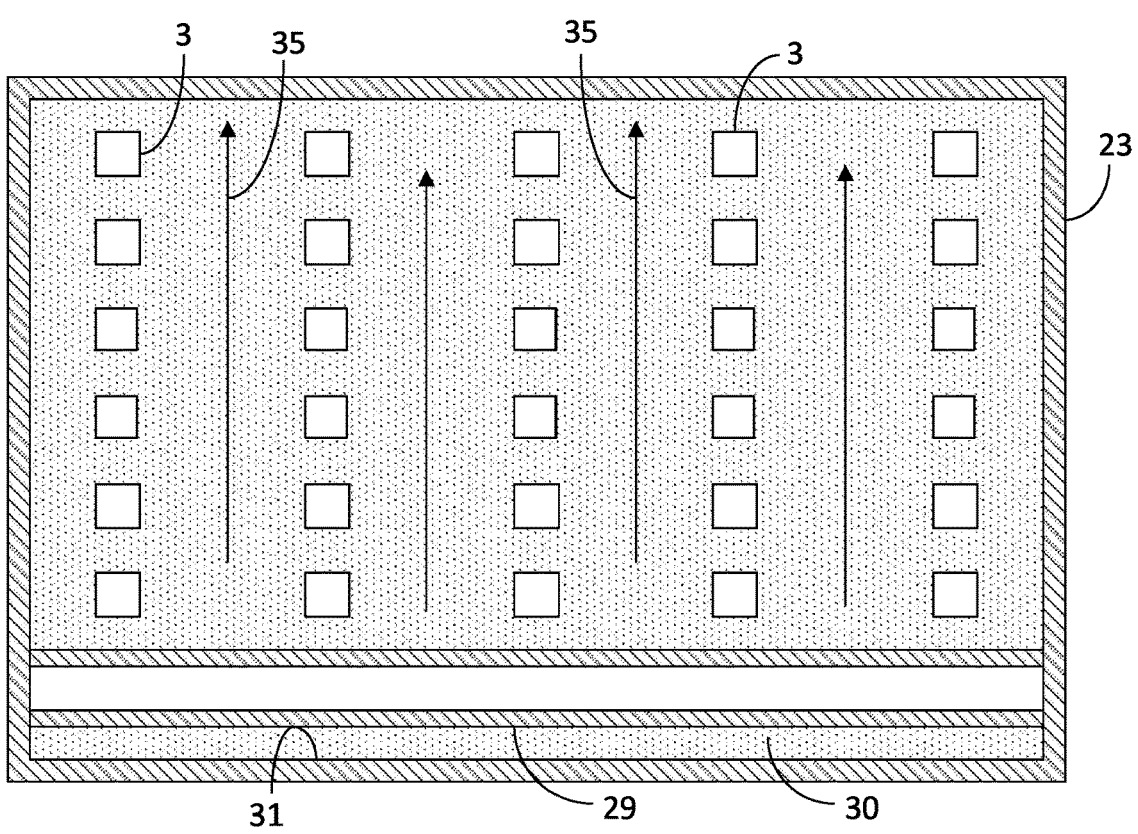
FIG. 4D is a horizontal, cross-sectional view of a lower portion of the heat exchanger shown in FIG. 4A and constructed in accordance with the present disclosure.
Figure 5A:
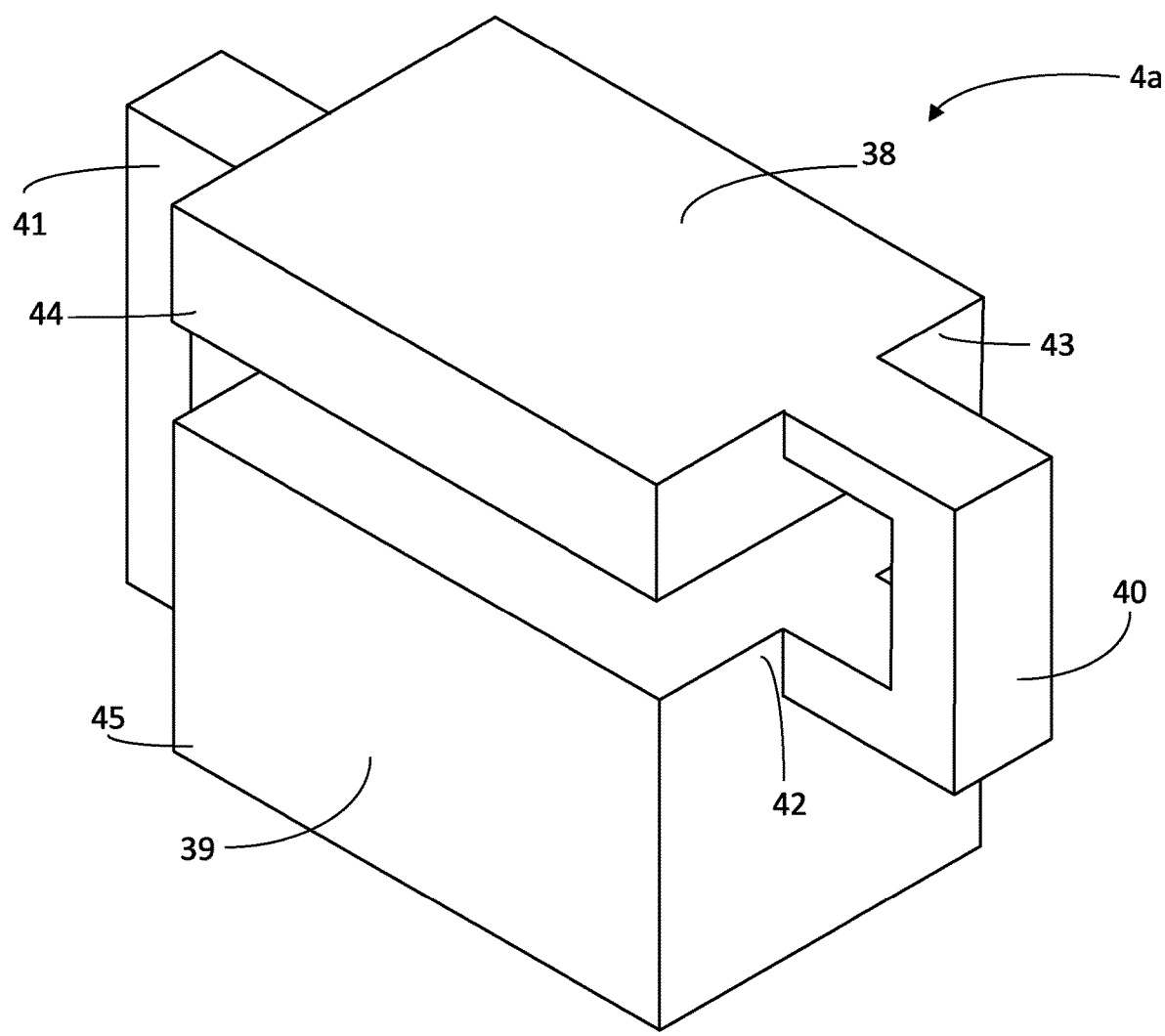
FIG. 5A is a perspective view of another embodiment of a heat exchanger constructed in accordance with the present disclosure.
Figure 5B:
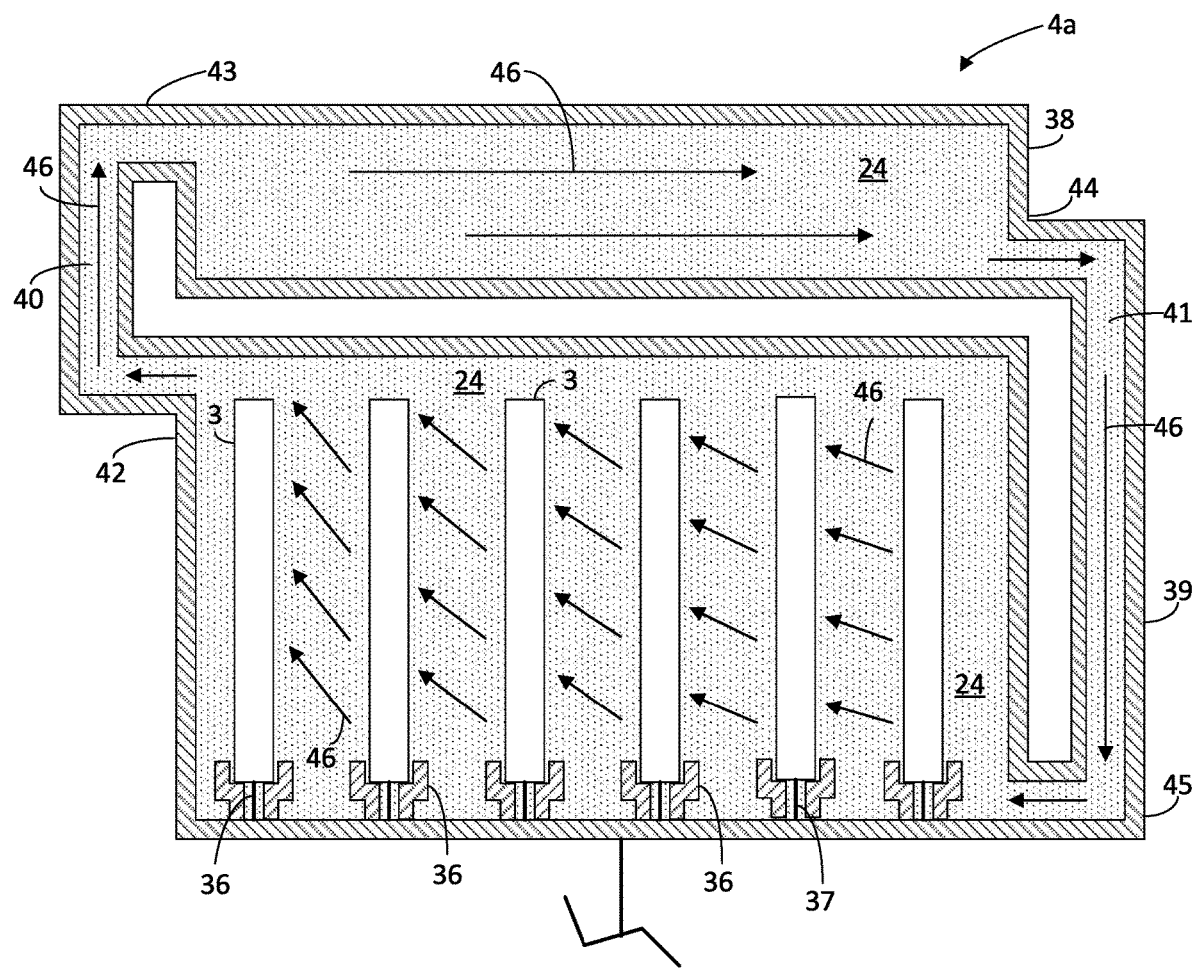
FIG. 5B is a vertical, cross-sectional view of a portion of the heat exchanger shown in FIG. 5A and constructed in accordance with the present disclosure.
Figure 5C:
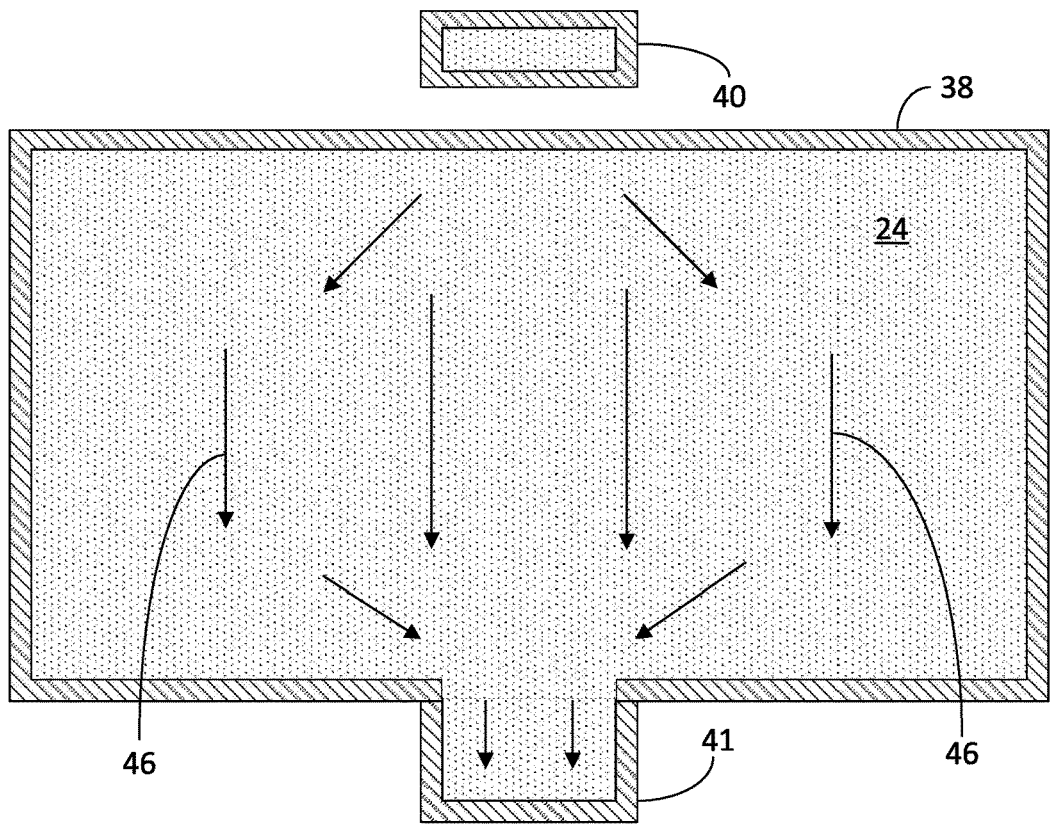
FIG. 5C is a horizontal, cross-sectional view of an upper portion of the heat exchanger shown in FIG. 5A and constructed in accordance with the present disclosure.
Figure 5D:
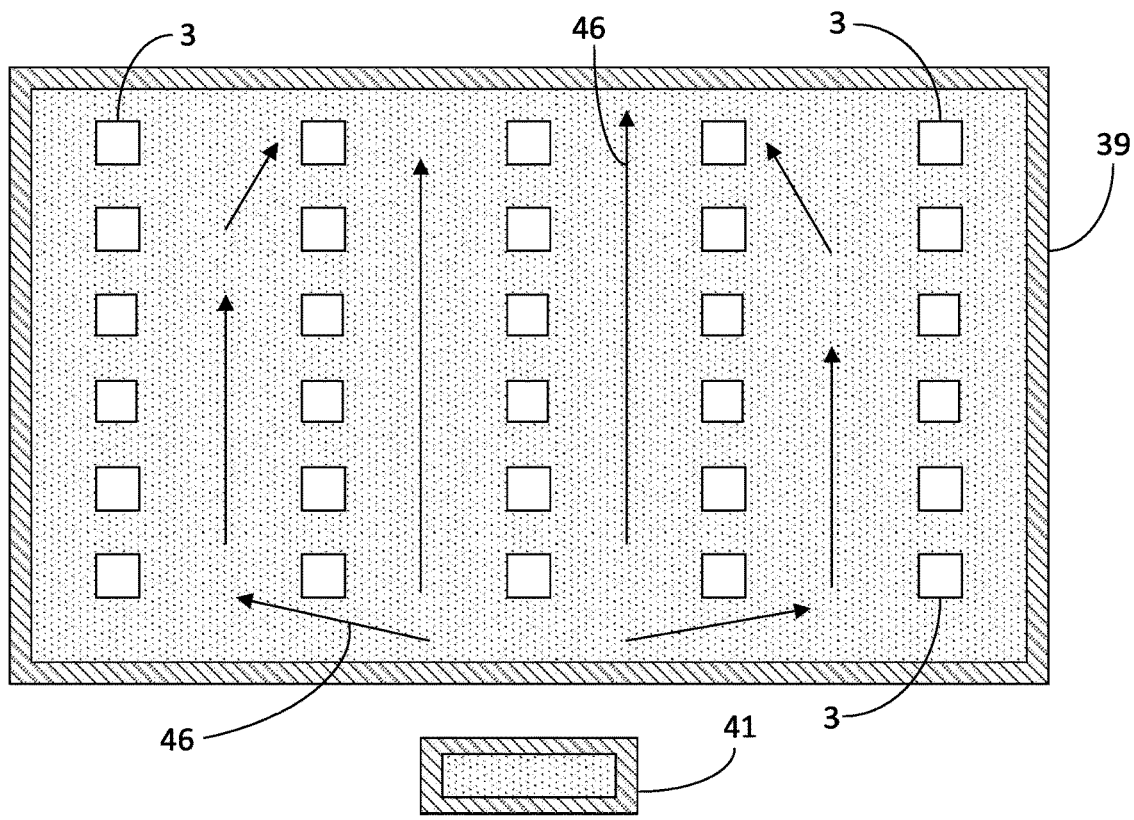
FIG. 5D is a horizontal, cross-sectional view of a lower portion of the heat exchanger shown in FIG. 5A and constructed in accordance with the present disclosure.

Referring now to FIG. 3, shown therein is an exemplary controller 6 that could be used to operate the electric integrated circuit water heater system 12 and operate the system display/user interface 13. Users can interface with the system 12 and controller 6 using the system display/user interface 13 unit that is linked, via a wired or wireless communication link, to the integrated circuit heating element controller 6 to select user settings such as target temperature S6, standby mode, troubleshooting issues within the system, check on health of the individual integrated circuit heating elements, create user accounts that keep track of the number of computational processes performed over a given time period to the prospective owner of the integrated circuit electric water heater apparatus 12. The controller 6 may include firmware or a computer readable medium that interfaces with the integrated circuit heating elements 3. The controller 6 can include a memory 14, a processor 15, and an interface 20, such as a graphical user interface (GUI). The memory 14 stores a set of instructions, software for operating the system 12, and any data used by the system 12. The processor 15 is linked, via a wired or wireless communication link, to the memory 14 to execute the set of instructions. The processor 15 represents generally any processor configured to execute program instructions stored in memory 14 to perform various specified functions. The interface 20 represents generally any interface enabling the controller 6 to communicate with a control module 18, a sensor module 19, and/or the data store via link. The memory 14 is illustrated to include an operating system 17, and applications 16. The operating system 17 represents a collection of programs that when executed by the processor 15 serves as a platform on which applications run. Examples of operating systems 17 include various versions of Microsoft's Windows® and Linux®. Applications 16 represent program instructions that when executed by the processor 15, control the integrated circuit heating elements 3. The controller 6 is illustrated to include a system network connection 11 via the link enabling remote access, firmware updates, and other required maintenance. The system network connection 11 can operate with standard wired or wireless connections. Examples include, but are not limited to, ethernet, wifi, bluetooth, and or satellite.

The control module 18 and the sensor module 19 of the controller 6 are linked to a data store. The control module 18 functionalities are accomplished via the link 11 that connects the control module 18 and the sensor 19 module to the data store. The data store represents generally any memory 14 configured to store data accessible by the control module 18 and/or the sensor module 19 in the performance of their functions. The data store is, for example, a database that stores, tank temperature readings and instructions to perform the functions of the control module 18 and the sensor module 19.

The sensor module 19 is configured to send data to and receive data from the electric integrated circuit water heater system 12. The sensor module 19 may also receive information such as tank water temperature using sensors. For example, the sensor module 19 may include temperature sensors, and flow sensors.

Referring now to FIGS. 4A-4D, shown therein is a heat exchanger 4 for use in the system 12 to heat the water in the storage tank 2. In this embodiment, the heat exchanger 4 can have an upper chamber 22 that is offset from a lower chamber 23 wherein the integrated circuit heating elements 3 are disposed in the lower chamber 23. The heat exchanger 4 can also include a low electrical conductivity liquid 24, which fills the upper chamber 22 and the lower chamber 23, and a thermosiphon apparatus 25 that extends through the heat exchanger. In one embodiment, the thermosiphon apparatus 25 includes an upper leg 26 that extends into the upper chamber 22 and creates an upper passage 27 between the upper leg 26 and an upper chamber wall 28. The thermosiphon apparatus 25 also includes a lower leg 29 that extends into the lower chamber 23 and creates a lower passage 30 between the lower leg 29 of the thermosiphon apparatus 25 and a lower chamber wall 31. The thermosiphon apparatus 25 also includes a barrier portion 32 that extends from the lower leg 29 to the upper leg 26 and separates the upper chamber 22 of the heat exchanger 4 from the lower chamber 23 of the heat exchanger 4. The upper passage 27 and the lower passage 30 are the only places where the upper chamber 22 and the lower chamber 23 are in fluid communication. The upper passage 27 is disposed in the upper chamber 22 in an upper offset part 33 of the heat exchanger 4 and the lower passage 30 is disposed in the lower chamber 23 in a lower offset part 34 of the heat exchanger 4.

The low electrical conductivity liquid 24 in the heat exchanger is heated by the integrated circuit heating elements 3 in the heat exchanger 4. When the integrated circuit heating elements 3 heat the low electrical conductivity liquid 24 it decreases the density of the low electrical conductivity liquid 24 and causes the low electrical conductivity liquid 24 to rise in the heat exchanger 4. The low electrical conductivity liquid 24 will flow in the direction of the arrows 35. As the low electrical conductivity liquid 24 rises in the heat exchanger 4, the low electrical conductivity liquid 24 will pass from the lower chamber 23, which is offset from the upper chamber 22, to the upper passage 27 in the upper offset part 33 of the heat exchanger 4. From the upper passage 27, the low electrical conductivity liquid 24 will flow in the direction of the arrows 35 in the upper chamber 22. As the low electrical conductivity liquid 24 flows across the upper chamber 22, the low electrical conductivity liquid 24 will begin to cool (density of the low electrical conductivity liquid 24 decreases) and the low electrical conductivity liquid 24 will flow toward, and through, the lower passage 30 in the lower offset part 34 of the heat exchanger 4. After the low electrical conductivity liquid 24 flows through the lower passage 30, the low electrical conductivity liquid 24 flows through the lower chamber 23 and around the integrated circuit heating elements 3 disposed in the lower chamber 23, which heats the low electrical conductivity liquid 24 back up and continues the flow of the low electrical conductivity liquid 24 in the heat exchanger without the need for any mechanical drivers (such as a pump). The heated low electrical conductivity liquid 24 transfers the heat from the integrated circuit heating elements 3 to the walls of the heat exchanger 4.

Referring now to FIGS. 5A-5D, shown therein is a heat exchanger 4a for use in the system 12 to heat the water in the storage tank 2. In this embodiment, the heat exchanger 4a can have an upper chamber 38 that is disposed above and separated from a lower chamber 39 wherein the integrated circuit heating elements 3 are disposed in the lower chamber 39. The heat exchanger 4a can also include the low electrical conductivity liquid 24, which fills the upper chamber 38 and the lower chamber 39. The heat exchanger 4a also includes an upper passage 40 that fluidically connects the lower chamber 39 and the upper chamber 38 and a lower passage 41 that also fluidically connects the upper chamber 38 to the lower chamber 39. In one embodiment, the upper passage 40 can extend from an upper part 42 of the lower chamber 39 to an upper part 43 of the upper chamber 38. Furthermore, the lower passage 40 can extend from a lower part 44 of the upper chamber 38 to a lower part 43 of the lower chamber 39. In a further embodiment, the upper passage 40 is disposed on the opposite side of the upper chamber 38 from the lower passage 41. Similarly, the upper passage 40 is disposed on the opposite side of the lower chamber 39 from the lower passage 41. The upper chamber 38, the lower chamber 39, the upper passage 40 and the lower passage 41 cooperate to create a thermosiphon affect in the heat exchanger 4a around the open space between the upper chamber 38 and the lower chamber 39 and between the upper and lower passages 40 and 41.

Similar to the operation of the heat exchanger 4, the low electrical conductivity liquid 24 in the heat exchanger 4a is heated by the integrated circuit heating elements 3 in the heat exchanger 4a. When the integrated circuit heating elements 3 heat the low electrical conductivity liquid 24 it increases the temperature and decreases the density of the low electrical conductivity liquid 2, which causes the low electrical conductivity liquid 24 to rise in the heat exchanger 4a. The low electrical conductivity liquid 24 will flow in the direction of the arrows 46. As the low electrical conductivity liquid 24 rises in the heat exchanger 4a, the low electrical conductivity liquid 24 will pass from the lower chamber 39 to and through the upper passage 40 of the heat exchanger 4a. From the upper passage 40, the low electrical conductivity liquid 24 will flow in the direction of the arrows 46 in the upper chamber 38. As the low electrical conductivity liquid 24 flows across the upper chamber 38, the low electrical conductivity liquid 24 will begin to cool (density of the low electrical conductivity liquid 24 decreases) and the low electrical conductivity liquid 24 will flow toward, and through, the lower passage 41 of the heat exchanger 4a. After the low electrical conductivity liquid 24 flows through the lower passage 41, the low electrical conductivity liquid 24 flows through the lower chamber 39 and around the integrated circuit heating elements 3 disposed in the lower chamber 39, which heats the low electrical conductivity liquid 24 back up and continues the flow of the low electrical conductivity liquid 24 in the heat exchanger 4a without the need for any mechanical drivers (such as a pump). The heated low electrical conductivity liquid 24 transfers the heat from the integrated circuit heating elements 3 to the walls of the heat exchanger 4a and to the water in the storage tank 2. The heat exchanger 4a has more surface area on the outside, which increases the amount of heat that can be transferred to the water in the storage tank 2.

The integrated circuit heating elements 3 can be secured in the heat exchanger 4 or 4a in any manner known in the art. In one embodiment, the integrated circuit heating elements 3 can be secured to support structures 36 secured to the bottom chamber 23 or 39 of the heat exchanger 4 or 4a. The integrated circuit heating elements 3 can be linked to the controller 6 via communication lines 37, which are in communication with the controller link 11.

The present disclosure is also directed toward a method of heating a liquid with the integrated circuits described herein. The method includes disposing integrated circuits in a storage tank of fluid desired to be heated. In one embodiment, the integrated circuits can be positioned within a heat exchanger and the heat exchanger can be placed in the storage tank to heat the fluid therein. Fluid that is desired to be heated can be supplied to the storage tank and heated water in the storage tank can be removed from the storage tank as desired. The temperature of the fluid in the storage tank can be monitored and measured. Based on the temperature of the fluid in the storage tank and the desired temperature of the fluid in the storage tank, the usage of the integrated circuits can be increased or decreased to achieve the desired temperature.

From the above description, it is clear that the present invention is well adapted to carry out the objectives and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. An electric integrated circuit water heater apparatus, the apparatus comprising:
   a storage tank having a cold water inlet and hot water outlet;
   at least one integrated circuit disposed within the storage tank to transfer heat to the cold water in the storage tank and raise the temperature of the cold water, the at least one integrated circuit performing computational processes; and
   a thermosiphon heat exchanger filled with a low electrical conductivity liquid, the thermosiphon heat exchanger positioned in the storage tank for capturing the heat generated by the at least one integrated circuit and transferring it to the cold water in the storage tank, the cold water in the storage tank separated from the at least one integrated circuit and the low electrical conductivity liquid by the thermosiphon heat exchanger wherein a thermosiphon loop occurs inside the thermosiphon heat exchanger, the heat exchanger comprises:
   an upper chamber;
   a lower chamber, the at least one integrated circuit disposed in the lower chamber;
   an upper passage that fluidically connects the lower chamber to the upper chamber;
   a lower passage that fluidically connects the upper chamber to the lower chamber wherein the at least one integrated circuit heats the low electrical conductivity liquid to decrease the density of the low electrical conductivity liquid and cause it to rise in the lower chamber towards the upper passage, through the upper passage and into the upper chamber, the low electrical conductivity liquid cools down in the upper chamber and lowers the density of the low electrical conductivity liquid and forces the low electrical conductivity liquid towards and through the lower passage and back to the lower chamber where the low electrical conductivity liquid comes back in contact with the at least one integrated circuit, which starts the thermosiphon loop over again.

2. The system of claim 1 further comprising a heat exchanger for capturing the heat generated by the at least one integrated circuit and transferring it to the cold water in the storage tank.

3. The system of claim 1 wherein the hot water outlet is positioned in an upper portion of the storage tank so that the cold water will pass the heat exchanger positioned in the storage tank before exiting the storage tank via the hot water outlet.

4. The system of claim 1 further comprising a temperature gauge to determine the temperature of water in the storage tank and an integrated circuit heating element controller for operating the at least one integrated circuit when the temperature of the water in the storage tank is below a predetermined temperature to heat the water to or above the predetermined temperature.

5. The system of claim 1 wherein the heat exchanger includes a thermosiphon apparatus therein with an upper leg that extends upward into the upper chamber, a lower leg that extends downward into the lower chamber and a barrier portion that extends between the upper leg and the lower leg and separates the upper chamber from the lower chamber.

6. The system of claim 1 wherein the upper passage and the lower passage are narrower than the upper chamber and lower chamber, respectively and an open space exists between the upper chamber and the lower chamber to provide more surface area of the heat exchanger to increase the transfer of heat to the water in the storage tank.

7. A method of heating a fluid in a storage tank with electrical integrated circuits, the method comprising:
   positioning electrical integrated circuits in a thermosiphon heat exchanger filled with a low electrical conductivity liquid contained therein, the thermosiphon heat exchanger positioned in a fluid storage tank, the electrical integrated circuits generating heat by performing computational processes for a computer system and causes a thermosiphon loop to occur in the thermosiphon heat exchanger, the heat exchanger comprises:
   an upper chamber;
   a lower chamber, the at least one integrated circuit disposed in the lower chamber;
   an upper passage that fluidically connects the lower chamber to the upper chamber; and
   a lower passage that fluidically connects the upper chamber to the lower chamber wherein the at least one integrated circuit heats the low electrical conductivity liquid to decrease the density of the low electrical conductivity liquid and cause it to rise in the lower chamber towards the upper passage, through the upper passage and into the upper chamber, the low electrical conductivity liquid cools down in the upper chamber and lowers the density of the low electrical conductivity liquid and forces the low electrical conductivity liquid towards and through the lower passage and back to the lower chamber where the low electrical conductivity liquid comes back in contact with the at least one integrated circuit, which starts the thermosiphon loop over again;
   providing the fluid to the storage tank to be heated by the electrical integrated circuits via the thermosiphon heat exchanger, the electrical integrated circuits and the low electrical conductivity liquid separated from the fluid in the storage tank by the thermosiphon heat exchanger;
   monitoring the temperature of the fluid in the storage tank; and
   removing a heated fluid from the storage tank after the heated fluid achieves a desired temperature.

8. The method of claim 7 further comprising adjusting the use of the electrical integrated circuits to generate additional heat or less heat for the storage tank.

9. The method of claim 7 wherein the heat exchanger includes a thermosiphon apparatus therein with an upper leg that extends upward into the upper chamber, a lower leg that extends downward into the lower chamber and a barrier portion that extends between the upper leg and the lower leg and separates the upper chamber from the lower chamber.

10. The method of claim 9 wherein the upper passage and the lower passage are narrower than the upper chamber and lower chamber, respectively, and an open space exists between the upper chamber and the lower chamber to provide more surface area of the heat exchanger to increase the transfer of heat to the water in the storage tank.

* * * * *